United States Patent Office 3,449,277
Patented June 10, 1969

3,449,277
COATING COMPOSITIONS COMPRISING DRYING OIL ACID ESTERS OF STYRENE-ACROLEIN CO-POLYMER-POLYMER REACTION PRODUCTS
Wayne E. Smith, Shawnee, Kans., Gerald J. Mantell, Kansas City, Mo., and Earl C. Chapin, Springfield, Mass., assignors to Gulf Oil Corporation, Pittsburgh, Pa., a corporation of Pennsylvania
No Drawing. Filed Feb. 3, 1966, Ser. No. 524,813
Int. Cl. C08f 27/12, 3/74
U.S. Cl. 260—23    9 Claims

ABSTRACT OF THE DISCLOSURE

Air drying compounds can be prepared by the reaction of (A) a vinylidene aromatic copolymer, (B) polyhydric alcohols having a 1,3-glycol structure represented by the formula

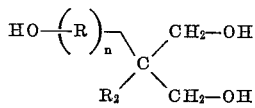

wherein $n$ may be zero or one and when $n$ is one R is a divalent hydrocarbon radical containing from 1 to 6 carbon atoms, and wherein $R_1$ is selected from the group of hydrogen, hydrocarbon radicals having from 1 to 6 crabon atoms, a hydroxy radical and a hydroxyalkyl radical having from 1 to 6 carbon atoms, and (C) a vegetable drying oil acid containing 18 carbon atoms.

---

This invention relates to a novel class of compounds, and more particularly to novel compositions prepared from a vinyl aromatic copolymer, polyhydric alcohols containing at least 3 hydroxyl groups and vegetable drying oil acids. This invention also relates to coating compositions prepared from these novel compounds.

It has been discovered, in accordance with this invention, that a novel class of air drying compounds can be prepared by the reaction of (A) a vinylidene aromatic copolymer, (B) polyhydric alcohols having a 1,3-glycol structure represented by the formula

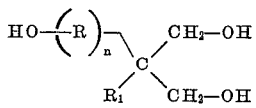

wherein $n$ may be zero or one and when $n$ is one R is a divalent hydrocarbon radical containing from 1 to 6 carbon atoms, and wherein $R_1$ is selected from the group of hydrogen, hydrocarbon radicals having from 1 to 6 carbon atoms, a hydroxy radical and a hydroxyalkyl radical having from 1 to 6 carbon atoms, and (C) a vegetable drying oil acid containing 18 carbon atoms.

The vinylidene aromatic copolymers are copolymers of a vinylidene aromatic compound and an acrolein or α-substituted acrolein, especially acrolein and methacrolein. Among the vinylidene aromatic compounds which may be used herein are styrene, ortho-methylstyrene, meta-methylstyrene, alpha-methylstyrene, and the various ring substituted chloro and dichloro styrenes. The copolymers contemplated in this invention will have a molecular weight of 700 to 3,000 and will contain from 40 to 80 percent by weight of the vinylidene aromatic compound chemically combined in the copolymer.

The polyhydric alcohols embodied in this invention contain at least three hydroxyl groups and must include, as indicated above, those having the 1,3-glycol structure

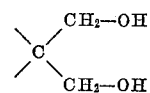

which will form cyclic acetals with the aldehyde groups of the acrolein component, and the polyhydric alcohols contemplated will contain from 3 to 15 carbon atoms. Examples of such polyhydric alcohols include glycerol, trimethylol ethane, trimethylol propane, 1,1,1 trimethylol ethane, trimethylol phenyl methane, pentaerythritol and the like, including mixtures thereof.

The drying oil acids useful in this invention are well known and are conventionally derived from vegetable drying oils such as linseed oil, soybean oil, tung oil, safflower oil, dehydrated castor oil and the like. Also included in this invention are the semi-drying oils and the so-called "bodied" oils which are modified by heating. Typical of these drying oil acids are linoleic acid, linolenic acid, parinaric acid and the like which normally contain 18 carbon atoms. In general, the drying oil acids will have a saponification number of 170 to 200, and iodine number of 80 to 200, and will contain at least two double bonds in the molecule.

Although the structural formulas of these novel compounds have not been definitely established, a study of reaction indicates the compounds of this invention are six-membered acetals which are probably formed according to the following equation:

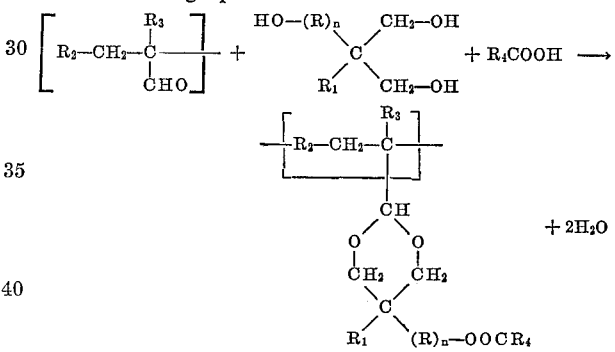

wherein R and $R_1$ have the values assigned above for the polyhydric alcohols, $R_2$ is a vinylidene aromatic compound as defined above, $R_3$ is a hydrogen or a methyl group, and $R_4$ contains 17 carbon atoms as the residue of the esterified drying oil acid. As will be understood, where $R_1$ is comprised of a hydroxy moiety, the product can be further esterified with an additional equivalent of the drying oil acid. This can be exemplified by reference to the preparation of the compositions of this invention utilizing a styrene-methacrolein copolymer and pentaerythritol as, respectively, the vinylidene aromatic copolymer and polyhydric embodiments, to wit:

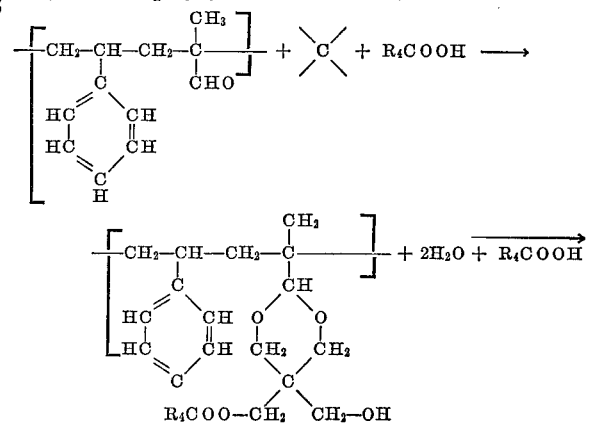

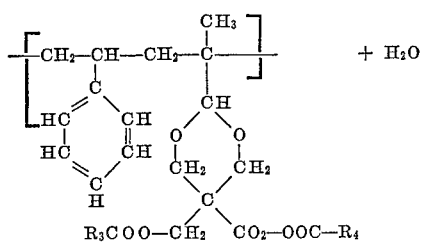

$+ H_2O$

The conditions of the reaction, under which the compounds of this invention are produced, can be varied within specifically defined limits. In general, the proportions of the reactants employed for preparing the compounds of this invention can vary in a weight ratio of 100 parts of the defined vinylidene aromatic copolymer, 50 to 100 parts of the defined polyhydric alcohol and 50 to 200 parts of the drying oil acids. Preferably, about 60 to 80 parts of the alcohol and 60 to 180 parts of the drying oil acids will be employed in the reaction.

While it may be possible at sufficiently elevated temperatures to induces the reaction to proceed without the use of a catalyst, a catalyst is normally employed to facilitate the preparation of the compounds. Preferably, the reaction is carried out in the presence of an acid catalyst such as p-toluene sulfonic acid, ortho-phosphoric acid, boron trifluoride, stannic chloride, etc. and mixtures thereof. Other catalysts which can also be used for the reaction are mildly acidic compounds such as ammonium chloride, oxalic acid and the like. The amount of catalysts employed may range from an effective tract amount to 0.5 percent by weight of the total weight of reactants employed. Preferably, the quantity of catalyst employed should be kept within the range of an effective trace amount to about 0.05 percent.

The reaction proceeds very readily at ambient pressures and at a temperature of 75 to about 300° C., but preferably the temperatures should lie in the range of about 130° C. to about 265° C. Reaction time for the reaction will depend upon the particular components employed, but will, in general, run from about 2 to 4 hours, although at times the reaction may proceed up to 10 hours or more.

The compounds of this invention can be prepared in a single stage process by simply admixing the defined reactants together and heating under the conditions indicated above. In an alternate process, an intermediate can be prepared by first reacting the vinylidene aromatic copolymer and the polyhydric alcohol wherein the alcohol reacts with the aldehyde groups of the copolymer to form a cyclic acetal therewith. The resultant intermediate will contain pendant alcohol groups which may then be reacted with the drying oil acids in a second stage step, as follows:

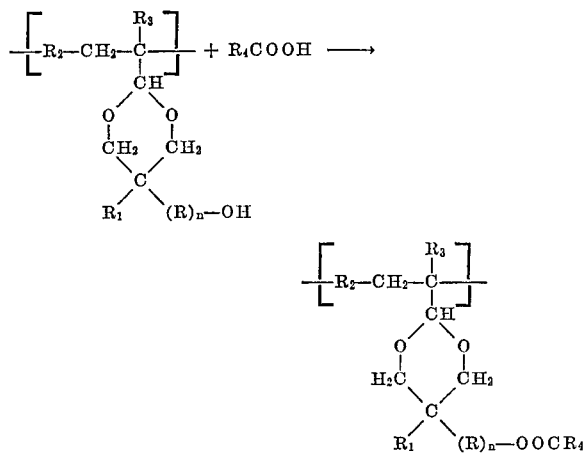

wherein $R$, $R_1$, $R_2$, $R_3$ and $R_4$ have the values assigned above. As regards the type of reaction employed, it can be seen that water is formed in the reaction, which should be desirably removed. A convenient method of effecting such water removal is by carrying out the reaction in a solvent such as, for example, benzene, toluene, xylene, diisobutyl ketone, methyl Cellosolve and the like, and mixtures thereof. The removal of water can be effected by simply permitting the water and solvent to distill out of the reaction where the solvent can be recovered by separation from water.

The compounds of this invention are air drying compositions which renders them useful for coating compositions, either alone or in combination with other film forming materials such as other alkyd resins, melamine-formaldehyde resins, phenol-formaldehyde resins, epoxide resins, and the like. Besides the film forming material, conventional additives and modifiers can also be used with the compositions of this invention, as for example, pigments, plasticizers, inhibitors, dispering agents and the like, normally in amounts conventionally employed in coating compositions. In addition, modification of the compositions of this invention can be effected for specialty applications by the inclusion of acrylate constituents chemically combined in the vinylidene aromatic copolymers comprehended in this invention, as for example a styrene/methacrolein/methyl methacrylate copolymer. The acrylate esters particularly effective for the modification of the vinylidene aromatic copolymers include acrylic and methacrylic esters of hydroxy alkyls having from 1 to 18 carbon atoms, as for example stearyl methacrylate.

The coating compositions contemplated will normally be employed in the form of a solution of the compounds of this invention dissolved in a suitable solvent. As will be understood, any solvent can be employed which will dissolve the compounds of this invention. A convenient solvent for such compositions which may be employed can be the same as that employed in preparing the compounds. In general, the coating compositions can be prepared to contain a range from 30 to 70 weight percent of the compounds of this invention in a suitable solvent, and preferably in the range of 40 to 60 weight percent of the compounds of this invention.

Coating compositions containing the compounds of this invention have excellent air-drying properties, and when applied to various substrates, such as wood, glass, metal, etc., the compositions provide dried coatings which are strong, flexible, glossy and water resistant. Although the compositions of this invention are self-drying, conventional accelerators (such a cobalt naphthenate), and siccative materials can be employed, if desired.

The following examples are presented to illustrate the invention, with all parts and percentages, unless otherwise indicated, specified as parts and percentages by weight.

EXAMPLE I

A styrene/methacrolein copolymer was prepared by mixing 60 parts of styrene, 40 parts of methacrolein and 1 part di-tertiary butyl peroxide in 100 parts of xylene, and heating the mixture in a sealed steel reactor for 30 minutes at 155 to 165° C. The resultant copolymer was separated from solvent and unreacted monomers by evaporation to provide 90 parts of the copolymer containing about 36 weight percent of chemically combined methacrolein.

About 17.5 parts of the copolymer, 12 parts of trimethylol ethane, 20 parts dehydrated castor oil acids and a catalytic amount of p-toluene sulfonic acid were dissolved in about 43 parts of xylene. The reaction mixture was refluxed over a temperature range of 150° C. to 275° C. for two hours with distillation of water and solvent. At the end of the reaction sufficient xylene was added to the product to provide a clear solution of about 50 percent total solids. This solution was cast on tin plate and allowed to dry overnight at ambient temperatures. The resultant film was clear, smooth and glossy, and exhibited no crazing on bending of the metal.

EXAMPLE II

Example I was repeated with the exception that 20 weight percent (based on the total solids of the product of Example I) of a butylated melamine-formaldehyde resin (Commercial Cymel 245-8) was added to the final solution. The resultant solution was then cast on tin plate, and the film cured at 150° C. for 20 minutes. The cured film was clear, hard and glossy, and showed excellent compatibility of the compounds of this invention with the aminoplast.

EXAMPLE III

A styrene/methacrolein copolymer was prepared as in Example I, and 35 parts of the copolymer was admixed in 86 parts of xylene with 18.4 parts of glycerin, 40 parts of dehydrated castor oil, and a catalytic amount of p-toluene sulfonic acid. The reaction mixture was then heated to 130–226° C. over one hour and ten minutes, and the temperature maintained at 225–230° C. over a period of one hour, with evolution of solvent and water. The resultant product was cooled to 150° C. and diluted with 75 parts of xylene. 146 parts of the solution was obtained containing 54.6 weight percent total solids. A catalytic quantity (0.009 part) cobalt naphthenate was then added to the solution, and the solution cast on tin plate. A number of the coated metal samples were dried overnight at ambient temperatures, to provide a film which was soft, clear, flexible and glossy. An equal number of coated metal samples were baked for 20 minutes at 150° C. The cured films were hard, glossy and clear, and would not craze when the coated tin plate was bent over double.

Although the invention has been described with reference to specific materials, embodiments and details, various modifications and changes, within the scope of the invention, will be apparent to one skilled in the art and are contemplated to be embraced within the invention.

What is claimed is:

1. Compounds comprising the reaction products of
   (A) A copolymer of a vinylidene aromatic compound and an acrolein selected from the group consisting of acrolein and methacrolein, and wherein said vinylidene aromatic compound is selected from the group consisting of styrene, methyl styrenes, chlorostyrenes and dichlorostyrenes.
   (B) A polyhydric alcohol having a 1,3-glycol structure selected from the group consisting of (a) 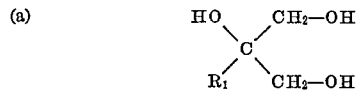

and (b) 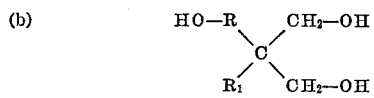

wherein R is a divalent radical having from 1 to 6 carbon atoms, and $R_1$ is selected from the group consisting of hydrogen, hydrocarbon radicals having from 1 to 6 carbon atoms, a hydroxy radical and a hydroxyalkyl radical having from 1 to 6 carbon atoms, and
   (C) Drying oil acids containing 18 carbon atoms, said copolymer containing about 40 to 80 percent by weight of said vinylidene aromatic compound monomer and having a molecular weight of about 700 to 3,000, said reaction product resulting from the reaction of about 100 parts said copolymer, about 50 to 100 parts said polyhydric alcohol, and about 50 to 200 parts said drying oil acid.

2. The compounds of claim 1 which comprise the reaction products of 100 parts by weight of said copolymer, 60 to 80 parts by weight of said alcohol and 60 to 180 parts by weight of said drying oil acids.

3. The compounds of claim 2 wherein said copolymer is styrene/methacrolein.

4. The compounds of claim 3 wherein said drying oil acids are dehydrated castor oil acids.

5. The process which comprises reacting together at 100 to 300° C. an admixture of
   (A) A copolymer of a vinylidene aromatic compound and an acrolein selected from the group consisting of acrolein and methacrolein, and wherein said vinylidene aromatic compound is selected from the group consisting of styrene, methyl styrenes, chlorostyrenes and dichlorostyrenes,
   (B) a polyhydric alcohol having a 1,3-glycol structure selected from the group consisting of (a) 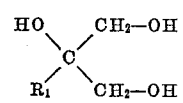

and

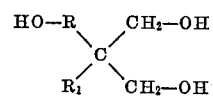

wherein R is a divalent radical having from 1 to 6 carbon atoms, and $R_1$ is selected from the group consisting of hydrogen, hydrocarbon radicals having from 1 to 6 carbon atoms, a hydroxy radical and a hydroxyalkyl radical having from 1 to 6 carbon atoms, and
   (C) drying oil acids containing 18 carbon atoms, said copolymer containing about 40 to 80 percent by weight of said vinylidene aromatic compound monomer and having a molecular weight of about 700 to 3,000, said reaction product resulting from the reaction of about 100 parts said copolymer, about 50 to 100 parts said polyhydric alcohol, and about 50 to 200 parts said drying oil acid.

6. The process of claim 5 wherein said admixture comprises 100 parts by weight of said copolymer, 60 to 80 parts by weight of said alcohol and 60 to 180 parts by weight of said drying oil acids.

7. The process of claim 6 wherein said copolymer is styrene/methacrolein.

8. The process of claim 7 wherein said drying oil acids are dehydrated castor oil acids.

9. The process which comprises
   (A) forming an intermediate by reacting together at 100 to 300° C. a copolymer of a vinylidene aromatic compound and an acrolein with a polyhydric alcohol wherein
      (a) said acrolein is selected from the group consisting of acrolein and methacrolein.
      (b) said vinylidene aromatic compound is selected from the group consisting of styrene, methyl styrenes, chlorostyrenes and dichlorostyrenes, and
      (c) said polyhydric alcohol has a 1,3-glycol structure selected from the group consisting of (a) 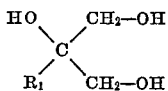

and (b) 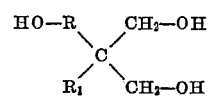

wherein R is a divalent radical having from 1 to 6 carbon atoms, and $R_1$ is selected from the group consisting of hydrogen, hydrocarbon radicals having from 1 to 6 carbon atoms, a hydroxy radical and a hydroxyalkyl radical having from 1 to 6 carbon atoms, and (B) reacting said intermediate at 100 to 300° C. with drying oil acids containing 18 carbon atoms, said copolymer containing about 40 to 80 percent by weight of said vinylidene aromatic compound monomer and having a molecular weight of about 700 to 3,000, said reaction product resulting from the reaction of about 100 parts copolymer, about 50 to 100 parts said polyhydric alcohol, and about 50 to 200 parts said drying oil acid.

References Cited

UNITED STATES PATENTS

| | | | |
|---|---|---|---|
| 2,657,192 | 10/1953 | Miller et al. | 260—67 |
| 2,839,507 | 6/1958 | Shokal et al. | 260—73 |
| 2,950,264 | 8/1960 | Chapin et al. | 260—23 |
| 2,984,633 | 5/1961 | Hahn | 260—23 |
| 3,154,599 | 10/1964 | Wismer et al. | 260—837 |
| 3,357,936 | 12/1967 | Zimmerman et al. | 260—22 |

HOSEA E. TAYLOR, Jr., *Primary Examiner.*

R. A. WHITE, *Assistant Examiner.*

U.S. Cl. X.R.

117—132; 220—64; 260—21, 33.6, 73